UNITED STATES PATENT OFFICE.

FRANK G. JOHNSON, OF BELLWOOD, SAG HARBOR, NEW YORK.

COMPOSITION TO PREVENT THE DEPREDATION OF INSECTS.

Specification forming part of Letters Patent No. 27,637, dated March 27, 1860.

*To all whom it may concern:*

Be it known that I, FRANK G. JOHNSON, of Bellwood, Sag Harbor, in the county of Suffolk and State of New York, have invented a new and useful article of manufacture, which I have denominated "Attenuated Coal-Tar," for the purpose of destroying insects and other vermin in the field and garden; and I do hereby declare that the following is a full, clear, and exact description of the nature and object of my invention.

It is well known that the damage caused by insects and vermin to the farmer and gardener is very great, and that there is hardly any crop or vegetable which is not liable to the ravages of one or more kinds of bugs, worms, or flies. The insect tribes affecting, as they do, a diminution of most agricultural productions throughout the world, renders a general preventative a subject of great importance.

Discovering that all animals, insects, and vermin have an utter repugnance to the presence of coal-tar, I commenced experimenting by placing it not in contact with but around about various plants covered with insects, which had the desired effect, demonstrating that coal-tar would prove an efficient remedy were it possible to handle and apply, and to bring it into immediate contact with the surface of the plant itself.

To accomplish this result constitutes the object of my invention, which consists in alternating coal-tar by coating with it common sand or sawdust, and afterward rolling the sand or sawdust so coated in earth, ashes, slaked or ground lime, plaster, or guano sufficiently so to deprive the coal-tar of its adhesive or sticking properties, and thus render it dry and clean to handle, and practicable to apply it to the surface of the ground and to the surface of the plants themselves without destroying in the least degree any of its obnoxious and destructive effects on insects and vermin.

The nature of my improvement consists, first, in rolling or otherwise mixing coal or common tar with dry sand or sawdust in such a manner that each particle of sand or sawdust shall be covered with a film or coating of the coal-tar or tar.

Second. The nature of my invention consists further in adding to and mixing with the said particles of tarred sand or sawdust a portion of earth, ashes, slaked or ground lime, plaster, or guano, in quantity sufficient to deprive each particle of the tarred sand or sawdust of its adhesive or sticking properties, and so to render the entire compound dry and suitable for use, and without any material tendency to stick together or to adhere to the plants, or to soil the hand when being used or applied.

I am aware that corn and perhaps other grain has been rolled in tar or soaked in tar-water before planting, with a view to prevent the ravages of birds or worms; but I do not know that coal-tar has ever been used in such a way. Neither do I claim in any manner such application or use. My invention has immediate and positive reference to the attenuation or manufacturing of coal-tar or tar by incorporation with particles of sand or sawdust, being thereby covered with a film or glaze of coal-tar or tar, and afterward rolled into or coated with ashes or the other substance described, and in the manner set forth, in order to be rendered suitable for use.

It is apparent that since the main object of my invention is to attenuate or manufacture coal-tar or tar in such a manner as to render it feasible to handle and apply it in a convenient and cleanly way for the specific purposes of destroying insects or to prevent their ravages on plants and vegetation, the same results may be obtained in a different although substantially the same way. For example, ground marble or plaster or bone-dust or gravel or even earth itself might be substituted for the sand or sawdust in the first process; or the coal-tar or tar might be first mixed with or thickened by the introduction of finely-powdered earth, ashes, or plaster, and the sand or sawdust coated with this mixture or composition; and, again, the second process, rendering the tarred sand or sawdust non-adhesive and suitable to handle, might be much varied, such as by the use of bran, chaff, or oxide of zinc, or even the flour of wheat or maize. I believe, however, the use of sand and ashes or common earth, as described by me, will prove to be the cheapest and best for the object sought to be accomplished.

What I claim, therefore, as my invention, and desire to secure by Letters Patent of the United States, is—

The composition and mode of attenuating coal-tar or tar with sand or sawdust, and afterward the coating of the sand or sawdust so tarred with earth, ashes, slaked or ground lime, plaster, or guano, substantially in the manner and for the purposes described.

FRANK G. JOHNSON.

Witnesses:
  W. H. GLEASON,
  JAMES WINTERS.